(12) United States Patent
Murin

(10) Patent No.: US 7,992,071 B2
(45) Date of Patent: *Aug. 2, 2011

(54) METHOD FOR IMPLEMENTING ERROR-CORRECTION CODES IN NON-VOLATILE MEMORY

(75) Inventor: Mark Murin, Kfar Saba (IL)

(73) Assignee: Sandisk IL Ltd., Kfar Saba (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/814,917

(22) Filed: Jun. 14, 2010

(65) Prior Publication Data

US 2010/0257428 A1 Oct. 7, 2010

Related U.S. Application Data

(63) Continuation of application No. 11/395,223, filed on Apr. 3, 2006, now Pat. No. 7,783,955.

(60) Provisional application No. 60/759,397, filed on Jan. 18, 2006.

(51) Int. Cl.
*G11C 29/00* (2006.01)
(52) U.S. Cl. ....................................... 714/763
(58) Field of Classification Search ............. 714/763
See application file for complete search history.

(56) References Cited

U.S. PATENT DOCUMENTS

| | | | |
|---|---|---|---|
| 5,615,154 A | 3/1997 | Yamada | |
| 6,041,001 A | 3/2000 | Estakhri | |
| 6,553,533 B2 | 4/2003 | Demura et al. | |
| 6,678,785 B2 | 1/2004 | Lasser | |
| 6,779,150 B1 | 8/2004 | Walton et al. | |
| 6,799,291 B1 | 9/2004 | Kilmer et al. | |
| 7,617,437 B2 * | 11/2009 | Moyer | 714/763 |
| 7,774,681 B2 * | 8/2010 | Earhart et al. | 714/763 |
| 2003/0142595 A1 * | 7/2003 | Morrison | 369/30.21 |

OTHER PUBLICATIONS

Office Action dated Nov. 20, 2008 and Response filed Mar. 16, 2009 in U.S. Appl. No. 11/395,223.
Office Action dated May 28, 2009 and Response filed Aug. 26, 2009 in U.S. Appl. No. 11/395,223.
Office Action dated Dec. 8, 2009 and Response filed Mar. 5, 2010 in U.S. Appl. No. 11/395,223.
Notice of Allowance dated Mar. 15, 2010 and Rule 312 Amendment filed May 19, 2010 in U.S. Appl. No. 11/395,223.

* cited by examiner

*Primary Examiner* — Scott T Baderman
*Assistant Examiner* — Enam Ahmed
(74) *Attorney, Agent, or Firm* — Toler Law Group

(57) ABSTRACT

A method in a data storage device for storing a plurality of data bits into a non-volatile memory includes transforming a plurality of data bits to be stored in a non-volatile memory device to generate a plurality of transformed data bits. The method further includes generating a parity bit corresponding to the plurality of transformed data bits, transforming the parity bit, and storing the plurality of data bits and the transformed parity bit in the non-volatile memory device. Each of the plurality of data bits and the parity bit form an all-one codeword.

20 Claims, 1 Drawing Sheet

METHOD FOR IMPLEMENTING ERROR-CORRECTION CODES IN NON-VOLATILE MEMORY

CLAIM OF PRIORITY

This application claims priority from and is a continuation of U.S. patent application Ser. No. 11/395,223 filed Apr. 3, 2006, entitled "METHOD FOR IMPLEMENTING ERROR-CORRECTION CODES IN FLASH MEMORY" which claims the benefit of Provisional Patent Application No. 60/759,397 filed Jan. 18, 2006, the content of each of which is incorporated herein by reference in its entirety.

FIELD OF THE DISCLOSURE

The present disclosure relates to a method and device for implementing error-correction code (ECC) in flash memory.

BACKGROUND

Flash memory devices have been known for many years. Within all flash memory devices, NAND-type memories differ from other types (e.g. NOR-type), among other characteristics, by the fact that a certain amount of information bits, written to the memory, may be read from the memory in a "flipped" state (i.e. different from the state that the original bits were written to the memory).

In order to overcome this phenomenon and to make NAND-type memories usable by real applications, it is a common technique to use ECC in conjunction with these memories. A general overview of using ECC in flash memories is described below which includes the following steps:

(1) Before writing data to the memory, an ECC algorithm is applied to the data in order to compute additional (i.e. redundant) bits, which are later used for error detection and correction. These redundant bits are often called parity bits or parity. A combination of the data input into an ECC module and the parity output by that module is called a codeword. Each different value of input data to an ECC module results in a different codeword.

(2) The entire codeword (i.e. the original data and the parity) is recorded to the flash memory. It should be noted, that the actual size of NAND-type flash memory is larger than the size of the original data, and the memory is designed to accommodate parity as well.

(3) When the data is being retrieved from the memory, the entire codeword is read again, and an ECC algorithm is applied to the data and the parity in order to detect and correct possible "bit flips" (i.e. errors).

It should be noted that the implementation of ECC may similarly be done by hardware, software, or a combination of both of them. Furthermore, ECC may be implemented within a memory device, a memory device controller, a host computer, or may be "distributed" among these components of a system.

Another well-known feature of flash memories is that data may only be programmed to the memory after the memory has been erased (i.e. data in the memory may not be overwritten, but rather erased and written again). The erase operation is performed on relatively large amounts of memory blocks (called erase blocks), and results in setting all the bits of the portion of erased memory to a logic value of one. This means that following an erase operation of a block of a NAND-type memory device, all the pages of that block will contain 0xFF (i.e. hexadecimal FF) data in all their bytes.

If further data is to be programmed to the erased page, the bits which have "zero-logic" (i.e. logic values of zero) will be programmed, while the bits which have "one-logic" (i.e. logic values of one) will remain in an "erased" state.

A vast majority of ECC schemes used with NAND-type flash memory devices have "linear" behavior, which means that for a data word consisting of "all-zero" data bits, all the parity bits have zero-logic as well (i.e. a codeword of all-zero logic, where all the bits have zero-logic, is a legal codeword). However, many of these codes are not "symmetrical" (i.e. the "0xFF" codeword, which is a codeword with both "all-one" data bits and "all-one" parity bits, is not a legal codeword).

As a simple example of the situation mentioned above, one may consider a simple even parity added to a byte of data. While an all-zero codeword (i.e. 0x00 plus zero-parity) is legal, an all-one codeword (i.e. 0xFF plus one-parity) is illegal. This situation may create a logic problem for system implementation as follows. If the system attempts to read a page which happens to be erased, and to apply ECC to the page, the ECC will "detect" that the codeword is wrong and will try to correct the codeword. If the ECC succeeds in correcting the all-one data, incorrect information would be presented to the application.

One may wonder why the system would read erased pages. The reason for this situation arising is that when the system "wakes-up" from power interruption, the system has no a priori knowledge of the location of the data in the flash memory. Therefore, the system has to perform a search of the flash memory medium in order to locate the written data and to reconstruct its RAM-resident databases, which will then allow the system to access data on the flash memory in a quick and efficient way.

During such a search as mentioned above, erased pages may be read in the process. When these pages are read, they should be identified as having been erased in order to enable correct construction of the RAM tables.

It is clear from the above discussion that it would be beneficial to system performance if erased pages could be handled correctly by ECC. By "handled correctly", it is meant that the ECC will not consider an erased page to have errors. Moreover, it would be beneficial that even in the event that some erased bits of the erased page are accidentally flipped to a "programmed" state, which may occur in practical flash memory devices due to various "parasitic" phenomena, the ECC should correct the affected bits and provide the system with "erased" (i.e. all 0xFF) data.

In some flash memory devices, the erasure procedure actually consists of two stages: (1) all the cells in a block are programmed to the high voltage-level (i.e. zero state), and (2) only after this step has occurred, an erase voltage is applied to the block. This procedure removes the charge from the cells, and converts the cells to the erased state.

The reason for such a two-stage process is to attempt to make all the cells in a block go through the same history of programming and erasing, which ensures that all cells in a block have relatively the same wear effects. In addition, this two-stage erasure procedure helps to make the voltage distributions of the cells narrower, which results in more reliable programming.

If the device power is interrupted following the first stage of such an erasure operation (i.e. following programming all the cells to a zero state), the pages of the block will remain programmed, and will be read upon power restoration as all-zero states. In this case, the ECC will report the correct data of 0x00 for the entire page. This may result in the flash-memory management algorithm, which attempts to reconstruct the flash memory database, being mislead.

Although the probability of the occurrence of such an event is not high (because power interruption would have to occur immediately following completion of the first stage of the erasure operation, but prior to initiation of the second stage), it would be beneficial for the system to have an "operation error" indication for this scenario.

SUMMARY

For the purpose of clarity, the term "complement" is specifically defined for use within the context of this application. The term "complement" is used to describe the inversion of every bit of data in a codeword (e.g. zero-logic is the complement of one-logic, and one-logic is the complement of zero-logic).

It is the purpose of the present disclosure to provide methods and means for implementing ECC in flash memory.

A method for storing a plurality of data bits into a non-volatile memory device includes performing, in a data storage device, transforming a plurality of data bits to be stored in a non-volatile memory device to generate a plurality of transformed data bits, and generating a parity bit corresponding to the plurality of transformed data bits. The method further includes transforming the parity bit and storing the plurality of data bits and the transformed parity bit in the non-volatile memory device. Each of the plurality of data bits and the parity bit form an all-one codeword.

In addition, a data storage device is disclosed and comprises a non-volatile memory and a memory controller. The memory controller is configured to transform a plurality of data bits to generate a plurality of transformed data bits, to generate a parity bit corresponding to the plurality of transformed data bits, to transform the parity bit, and to store the plurality of data bits and the parity bit in the non-volatile memory. Each of the plurality of data bits and the transformed parity bit form an all-one codeword.

These and further embodiments will be apparent from the detailed description and examples that follow.

BRIEF DESCRIPTION OF THE DRAWINGS

The present disclosure is herein described, by way of example only, with reference to the accompanying drawing, wherein.

DETAILED DESCRIPTION

Figure 1:
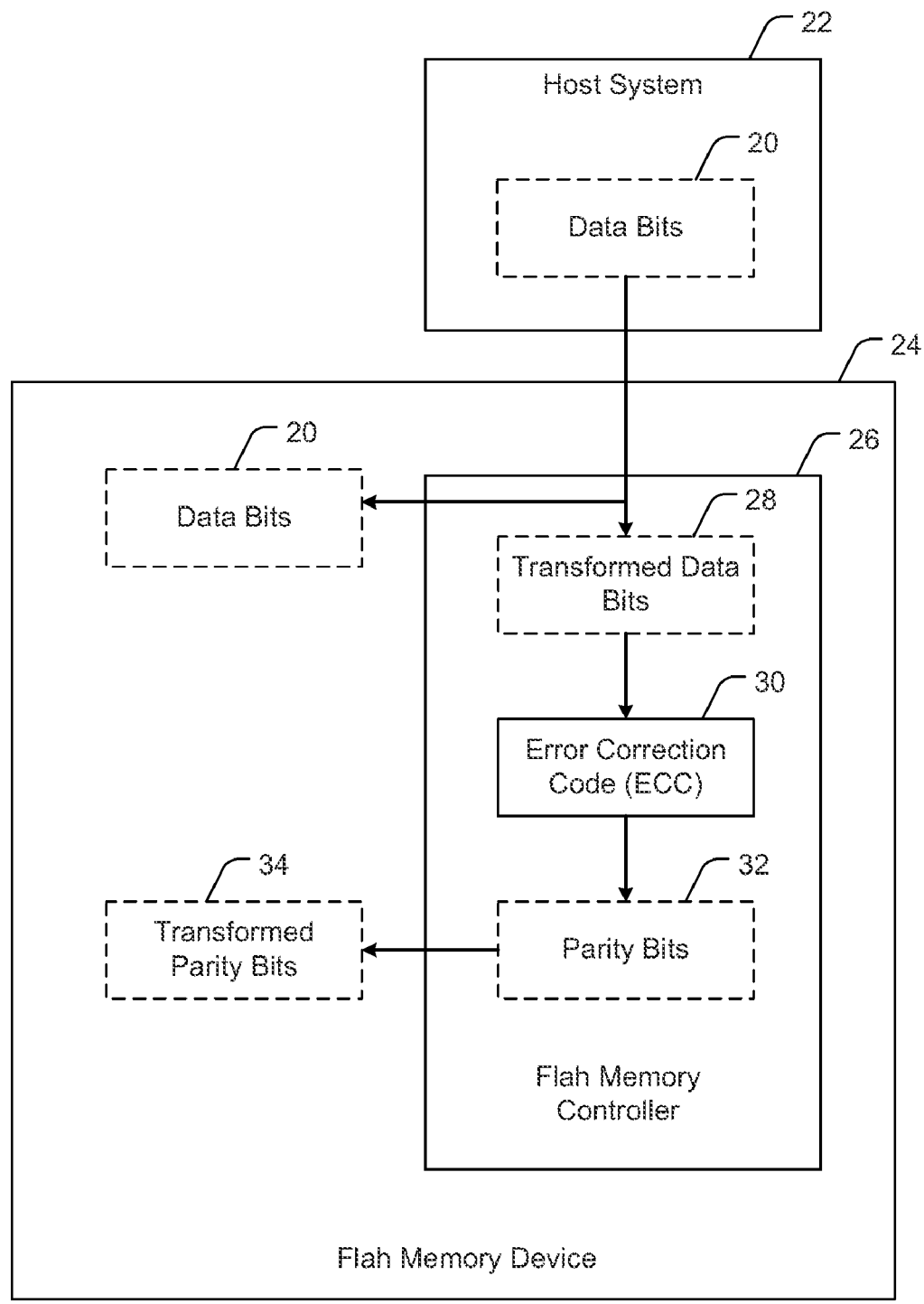
FIG. 1 shows a simplified schematic diagram of a flash memory device with implemented ECC according to embodiments of the present disclosure.

The present disclosure is of a method and device for implementing ECC in flash memory. The principles and operation for implementing ECC in flash memory, according to the present disclosure, may be better understood with reference to the accompanying description and the drawing.

Embodiments of the present disclosure rely on the main step of switching between all-zero codewords and all-one codewords, making all-one codewords legal and all-zero codewords illegal from the perspective of the ECC.

This may be accomplished by inverting the data and the parity in the course of the ECC computations as follows: (1) for computing the parity, use the complement of the data (but store the original data in the flash memory); (2) store in the flash memory a complement of the parity which was computed in step (1); and (3) while reading the data, use the complement of the data and the complement of the stored parity for error detection and correction functions.

Let us consider the example, from the background section of this application, in which the ECC computations are modified in accordance with the above. In that example the codewords have eight data bits plus one parity bit, where all legal codewords have an even number of one-logic data bits. As is known in the art, a simple code scheme such as this can detect the existence of one error in a codeword, but has no error-correction capability. Embodiments of the present disclosure are described with reference to this type of simple code scheme in order to make it easy to understand them. However, as can be recognized, the present disclosure is similarly applicable to various code schemes of differing complexity, as long as the code scheme includes the criterion of the all-zero codeword being a legal codeword.

Applying the above-mentioned method to the example provides:

(1) The data byte of 0x00 will be converted to 0xFF for the sake of parity computation, and will have zero-parity. Therefore, this data will be recorded into the flash memory as a codeword of 0b000000001.

(2) The data byte of 0xFF will be converted to 0x00 for the computation of parity, and will have zero-parity. Therefore, this data will be recorded into the flash memory as a codeword of 0b111111111. [0045] (3) Reading the codeword of 0x000000001 will result in data 0x00, and will have zero-parity, which is a legal codeword. [0046] (4) Reading the codeword of 0x111111111 will result in data 0xFF, and will have zero-parity, which is a legal codeword as well. [0047] (5) Reading the codeword of 0x000000000 will result in data 0x00, and will have one-parity, which indicates an operation error.

One may see, that case (4) above exactly represents the case of an erased page (which has both all-one data and all-one parity), and as was our goal, results in the ECC considering it a legal codeword. Case (5) represents the situation in which the power to the flash memory has been interrupted immediately following the first stage of the erase process (i.e. programming of all cells), and results in the ECC reporting it as an operation error.

Thus, the method of the ECC computation described above, has achieved two goals: (1) the erased page became "ECC-legal", thus simplifying the flash-memory management algorithm; and (2) there is an indication of operation error by the ECC for the case in which flash memory power has been interrupted in the middle of an erasure procedure.

It should be noted that the suggested modification to the ECC computation may be similarly applied to "symmetric" codes (i.e. codes in which both all-zero codewords and all-one codewords are legal). Clearly, in such a case, erased pages will be handled correctly even without this modification.

It should also be noted that, while the example discussed in this application is limited to error detection only, the methods described herein are similarly valid for more complex codes, which support detection as well as correction of errors in the data. As can be shown, the methods may be used for any linear systematic code, even though the methods are more useful when the all-one codeword is not a legal codeword.

A device which incorporates the methods of the present disclosure described above into its operation can be better understood with the aid of FIG. 1. FIG. 1 shows a simplified schematic diagram of a flash memory device with implemented ECC according to embodiments of the present disclosure. Data bits 20, located on a host system 22, are transferred to a flash memory device 24 by a flash memory controller 26. Flash memory controller 26 stores data bits 20 on flash memory device 24, and transforms data bits 20 into transformed data bits 28. Flash memory controller 26 then transfers transformed data bits 28 to an error-correction code 30, located within flash memory controller 26. Error-correction code 30 generates parity bits 32. Parity bits 32 are then transformed into transformed parity bits 34 by flash memory controller 26. Transformed parity bits 34 are then stored on flash memory device 24 by flash memory controller 26.

It is noted that both transformed data bits 28 and transformed parity bits 34 may be complements of data bits 20 and parity bits 32, respectively. It is further noted that the codeword generated by ECC 30 is a concatenation of transformed data bits 28 and parity bits 32. In alternate embodiments, the functions of flash memory controller 26, described above, can be performed by software or hardware residing on host system 22. Furthermore, ECC 30 may be implemented via software within flash memory device 24 or host system 22.

While the disclosure has been described with respect to a limited number of embodiments, it will be appreciated that many variations, modifications, and other applications of the disclosure may be made.

What is claimed is:

1. A method for storing a plurality of data bits into a non-volatile memory device, the method comprising:
   in a data storage device, performing:
      transforming a plurality of data bits to be stored in a non-volatile memory device to generate a plurality of transformed data bits;
      generating a parity bit corresponding to the plurality of transformed data bits;
      transforming the parity bit; and
      storing the plurality of data bits and the transformed parity bit in the non-volatile memory device, wherein each of the plurality of data bits and the transformed parity bit form an all-one codeword.

2. The method of claim 1, wherein the transformed parity bit is a complement of the parity bit.

3. The method of claim 1, further comprising applying an error-correction code to the plurality of transformed data bits.

4. The method of claim 3, wherein the error-correction code includes a linear systematic code.

5. The method of claim 1, wherein transforming the plurality of data bits includes generating complements of the plurality of data bits.

6. The method of claim 1, further comprising storing the plurality of transformed data bits within the non-volatile memory device.

7. The method of claim 1, further comprising detecting a data error using the plurality of transformed data bits and the transformed parity bit.

8. The method of claim 1, further comprising indicating an operational error when power to the flash memory device is interrupted during an erasure procedure.

9. The method of claim 1, further comprising applying an error-correction code at the data storage device.

10. The method of claim 1, further comprising applying an error-correction code at a host device coupled to the data storage device.

11. The method of claim 1, further comprising receiving the plurality of data bits at the data storage device from a host device.

12. The method of claim 1, wherein the codeword is represented by a 0xFF hexadecimal value.

13. A data storage device comprising:
   a non-volatile memory; and
   a memory controller configured to:
      transform a plurality of data bits to generate a plurality of transformed data bits;
      generate a parity bit corresponding to the plurality of transformed data bits;
      transform the parity bit; and
      store the plurality of data bits and the transformed parity bit in the non-volatile memory, wherein each of the plurality of data bits and the transformed parity bit form an all-one codeword.

14. The device of claim 13, wherein the transformed parity bit is a complement of the parity bit.

15. The device of claim 13, wherein the plurality of transformed data bits is a plurality of complements of the plurality of data bits.

16. The device of claim 13, further comprising an error-correction code module coupled to the memory controller, wherein the error-correction code module is configured to generate a second parity bit corresponding to the plurality of data bits.

17. The device of claim 16, wherein the memory controller is further configured to transfer the plurality of transformed data bits to the error-correction code module.

18. The device of claim 16, wherein the error-correction code module is included in the memory controller.

19. The device of claim 16, wherein each codeword generated by the error-correction code module from the plurality of data bits includes at least one zero bit value.

20. The device of claim 16, wherein the codeword is represented by a 0xFF hexadecimal value.

* * * * *